United States Patent Office 2,847,196
Patented Aug. 12, 1958

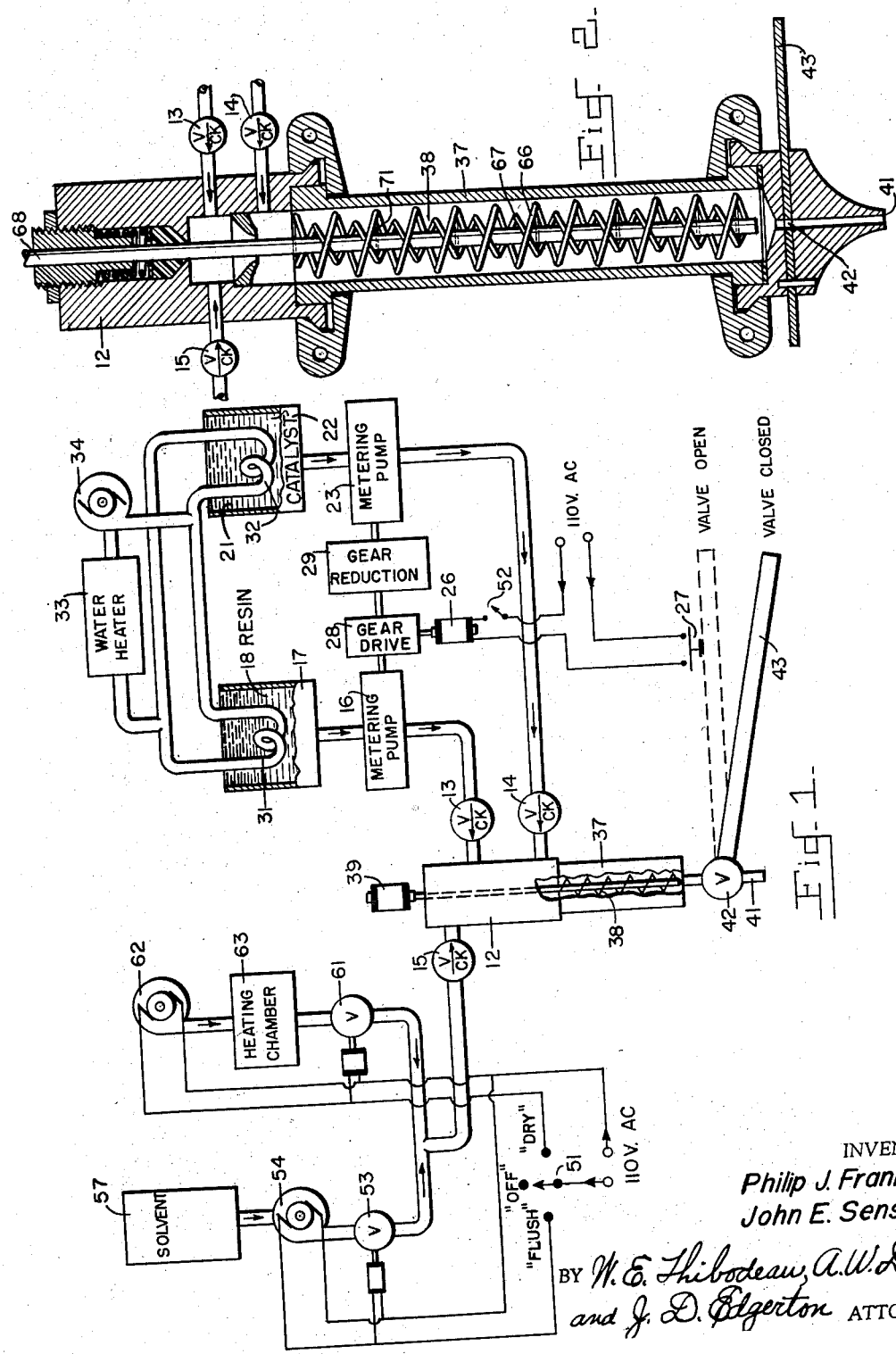

2,847,196

DISPENSER FOR THERMOSETTING MATERIALS

Philip J. Franklin, Washington, D. C., and John E. Sensi, Arnold, Pa., assignors to the United States of America as represented by the Secretary of the Army Application June 28, 1955, Serial No. 518,700

2 Claims. (Cl. 259—8)

(Granted under Title 35, U. S. Code (1952), sec. 266)

The invention described herein may be manufactured and used by or for the Government for governmental purposes without the payment to us of any royalty thereon.

This invention relates to mixing and dispensing and more particularly to the automatic or semi-automatic mixing and dispensing of thermosetting mixtures.

A typical thermosetting material is made by adding a small proportion of a suitable catalyst to a suitable resin. The resin, initially in liquid form, starts to set or harden shortly after the catalyst is added. In typical applications the mixture is poured into a mold or other desired receptacle shortly after the catalyst has been added to the resin and is allowed to harden in the mold. Prior to our invention it was usual to mix the resin and catalyst in individual batches, even when large numbers of molds were to be filled—for example, when large numbers of electronic devices were to be protectively embedded, or potted, in thermosetting resins having suitable mechanical and electrical properties. Our invention makes it possible to fill molds with thermosetting materials much more economically than in the past.

In a typical embodiment of the invention a mixing chamber containing an electrically-driven stirrer is provided at its lower end with an output aperture. Valve means is provided for opening and closing the output aperture to control outflow from the mixing chamber. When the valve means is moved from the "closed" to the "open" position, an electric switch is automatically closed. The closing of this switch applies current to an electric motor that drives two metering pumps; the ratio of the pumping rates of the two pumps is predetermined. One of the pumps forces a liquid resin into the mixing chamber, while the other pump forces into the mixing chamber a catalyst adapted to cause setting of the resin. The resin and catalyst are mixed in the mixing chamber and flow out of the output aperture. When the valve means is moved from the "open" to the "closed" position the pumps stop automatically. If the apparatus were left idle for a substantial time with the mixing chamber filled with the resin-catalyst mixture, the mixture would harden. Switch-controlled purging means is therefore preferably provided, for flushing the mixing chamber with a suitable solvent to remove the resin-catalyst mixture and then with heated air to remove the solvent.

A principal object of the invention is to provide economical and convenient means for the automatic or semi-automatic mixing and dispensing of thermosetting mixtures.

Another object is to provide a convenient mixer-dispenser wherein the movement of a single control from an "off" to an "on" position causes a catalyst to be automatically added to and mixed with a resin in correct proportion to produce a thermosetting mixture and causes the mixture to be automatically dispensed through an output aperture.

Another object is to provide an automatic or semi-automatic mixing and dispensing device for thermosetting mixtures, the device to be provided with an automatic or semi-automatic purging system for removing the thermosetting mixture from the device in the event that the device is to stand idle for a time that would be sufficient to permit an objectionable degree of setting of the mixture within the device.

Other objects, aspects, uses, and advantages of the invention will become apparent from the following description and from the accompanying drawing, in which—

Figure 1 is a block diagram showing principal features of a preferred embodiment of the invention.

Figure 2 is a longitudinal section of a preferred mixing-and-output subassembly in accordance with the invention.

In Fig. 1, a reception head 12 is adapted to receive fluids through check valves 13, 14, and 15. Check valve 13 is connected through a first metering pump 16 to a first tank 17 containing a liquid resin 18 that is adapted to solidify or set after the addition of an appropriate amount of an appropriate catalyst 21 contained in a second tank 22. Check valve 14 is connected through a second metering pump 23 to second tank 22.

An electric motor 26 is adapted to be turned on by the application of electric current upon the closing of a push-button switch 27. An auxiliary motor shut-off switch 52 is also provided; switch 52 is closed except during the purging operation to be described below. Motor 26 drives a gear drive 28. Gear drive 28 drives first metering pump 16 directly and drives second metering pump 23 through a gear reduction box 29.

Resin 18 in first tank 17 and catalyst 21 in second tank 22 are kept at a desired temperature by means of hot-water coils 31 and 32 through which heated water from a water heater 33 is circulated by means of a pump 34.

Reception head 12 discharges at its lower extremity into a mixing chamber 37 containing a stirrer 38 driven by an electric motor 39.

Mixing chamber 37 is provided at its lower extremity with an output aperture 41. Output aperture 41 is provided with a valve 42 controlled by a lever 43.

When lever 43 is in the position shown by the solid outline in the drawing, valve 42 is closed, switch 27 is open, and metering pumps 16 and 23 are inactive. When it is desired to dispense catalyzed resin from aperture 41, lever 43 is moved to the position shown by the dashed line. This motion simultaneously opens valve 42 and closes switch 27, thus activating metering pumps 16 and 23, thus causing resin 18 and catalyst 21 to be pumped in the correct proportions into reception head 12 and mixing chamber 37 and to be dispensed, properly mixed, from aperture 41.

Catalyzed resin can thus be mixed to order, so to speak, and dispensed from aperture 41, simply by moving lever 43 to the "valve open" position. The arrangement is well suited to the successive filling of a large number of molds or other devices.

If the apparatus were to be allowed to stand idle for a substantial time with catalyzed resin in reception head 12 and mixing chamber 37, it will be understood that the catalyzed resin would begin to set or harden and that this could cause difficulties. Accordingly, we prefer to provide means for purging the system of catalyzed resin when the apparatus is to stand idle. A preferred purging system is shown by those portions of Fig. 1 yet to be described.

The purging system is controlled by a three-position switch 51 having "off," "flush," and "dry" positions. When it is desired to purge the system, auxiliary motor shut-off switch 52 is opened, and valve 42 is opened by moving lever 43 to the "valve open" position; although lever 43 closes switch 27, switch 52 prevents motor 26 and pumps 16 and 23 from being activated. Switch 51 is thrown to the "flush" position to open a solenoid-controlled valve 53 and activate an electrically-driven pump 54 that pumps a suitable solvent from a tank 57 through check valve 15 into reception head 12, through mixing chamber 37, and out of output aperture 41. When sufficient flushing has been accomplished, switch 51 is thrown to the "dry" position. Throwing switch 51 to the "dry" position opens another solenoid-operated valve 61 and activates another electrically driven pump 62 that forces air through a heating chamber 63 and thence through solenoid-operated valve 61, check valve 15, reception head 12, mixing chamber 37, and output aperture 41. The heated air thus circulated when switch 51 is thrown to the "dry" position removes residual solvent; if not removed, this residual solvent would contaminate early portions of resin and catalyst subsequently admitted to reception head 12 and mixing chamber 37.

If desired, the purging system shown in Fig. 1 can be modified to provide for automatic purging at preset intervals. Such automatic purging can be readily accomplished with an appropriate timing device and solenoids and makes it unnecessary for a human operator to re-member to activate the purging system before leaving the apparatus idle.

It will be apparent that the apparatus shown can be adapted to use for mixing and dispensing multi-constituent, as well as two-constituent, thermosetting materials; it is necessary merely to provide a suitable number of tanks, check valves, and metering pumps.

Fig. 2 shows a preferred form of reception head 12, mixing chamber 37, stirrer 38, valve 42, lever 43, and outlet aperture 41. Stirrer 38 is preferably of a dual-helix construction believed to be novel. Two metal helixes 66 and 67, of left-hand and right-hand screw configurations respectively, are supported generally co-axially with respect to a stirrer shaft 68, preferably by means of a series of transverse pins 71. Pins 71 extend radially from shaft 68 and at their extremities are attached to helixes 66 and 67, preferably by soldering or brazing, to provide adequate support and rigidity.

It will be apparent that the embodiments shown are only exemplary and that various modifications can be made in construction and arrangement within the scope of the invention as defined in the appended claims.

We claim:

1. Apparatus for automatically mixing and dispensing a thermosetting material, comprising: a first reservoir containing a resin; a second reservoir containing a catalyst adapted to cause setting of said resin when mixed therewith; a first metering pump for withdrawing resin from said first reservoir; a second metering pump for withdrawing catalyst from said second reservoir; a first electric motor; gear means driven by said motor for causing flow of said resin from said first metering pump and of said catalyst from said second metering pump in response to the application of electric supply current to said motor, the ratio of flow of resin to flow of catalyst being determined by said gear means; automatic mixing means for mixing outflows of said pumps, said mixing means comprising a reception head, first and second check valve means for admitting the outflows of said first and second metering pumps respectively to said reception head, a mixing chamber below said reception head, a stirrer inside said chamber, a shaft fixedly connected to said stirrer, and a second electric motor connected to said shaft for driving said shaft; an outlet aperture for dispensing outflow from said mixing means; output valve means for opening and closing said outlet aperture; electric switch means associated with said outlet valve means for switchably applying electric current to said first electric motor, said current being automatically turned on when said outlet aperture is open and turned off when said outlet aperture is closed; purging means comprising: a third reservoir containing a solvent; a third check valve in said reception head; duct means for conducting said solvent from said third reservoir to said third check valve; electrically operated third pump means and solenoid valve means interposed in said duct means; second electric switch means for switchably controlling the application of electric current to said third pump means and to said solenoid valve, solvent being caused to flow into said reception head when said switch is in a "flush" position; third electric switch means; and means controlled by said third electric switch means for switchably injecting heated air onto said duct means between said third check valve and said third pump means and solenoid valve means.

2. The invention according to claim 1, there being additionally provided heating means for said resin and said catalyst, comprising: a water tank; means for heating the water in said tank to a desired temperature; first and second fluid-conducting coils in said first and second reservoirs respectively; and fourth means for circulating heated water from said tank through said coils and back to said tank.

References Cited in the file of this patent

UNITED STATES PATENTS

| 1,115,518 | Dwiggins | May 3, 1914 |
| 1,941,808 | McConnaughay | Jan. 2, 1934 |
| 2,207,884 | Holmen | July 16, 1940 |
| 2,366,673 | Paley | Jan. 2, 1945 |
| 2,435,884 | Galewski | Feb. 10, 1948 |
| 2,448,538 | Mason | Sept. 7, 1948 |
| 2,732,502 | Darney | Jan. 24, 1956 |
| 2,788,337 | Preiswerk et al. | Apr. 9, 1957 |

FOREIGN PATENTS

| 292,479 | Germany | June 13, 1916 |